March 20, 1956   R. E. RILEY   2,738,977
BOWLING PIN
Filed July 28, 1950

INVENTOR.
Ralph E. Riley
BY
John P. Truscott
ATTORNEY

United States Patent Office 2,738,977
Patented Mar. 20, 1956

2,738,977

BOWLING PIN

Ralph E. Riley, Akron, Ohio

Application July 28, 1950, Serial No. 176,492

3 Claims. (Cl. 273—82)

The present invention relates to bowling pins and particularly relates to the provision of a metal base portion for what is commonly termed a plastic pin which may be all plastic or partially of plastic. The term "plastic" includes synthetic resins, hard rubber and like substances and for the purposes of illustration in the drawings the material is indicated as a hard rubber.

Another object of this invention is to provide means for molding the plastic material about the pin while keeping the metal base portions in proper relation to the core.

In the drawings—

Figure 3:
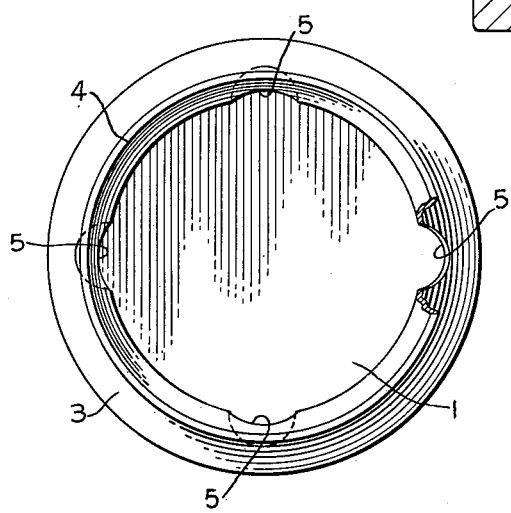

The metal base portion comprises a bottom wall 1, an outer peripheral wall 2, an inwardly and upwardly extending wall 3 and a lip portion 4 which extends upwardly and outwardly at an angle to receive the core of the bowling pin. As best illustrated in Fig. 3 the metal base is substantially imperforate except for the four perforations 5 arranged at the juncture of the wall 3 and the lip 4. It is understood that the particular arrangement of the perforations is not to be considered as limiting the invention but the function of these openings is to permit the plastic material to extend outside of the base portion so that in the molding operation it will be joined with the plastic in the outer wall of the bowling pin.

Figure 2:
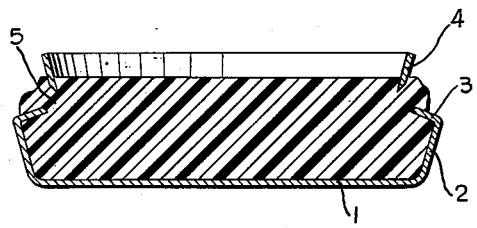
Fig. 2 is an enlarged cross-sectional view of the base portion showing the manner of interlock of the plastic with the metal base member and Fig. 3 is a plan view of the metal base portion shown in Fig. 2.

The first step in the process of making the bowling pin is shown in Fig. 2 and in this figure I have shown the base portion 1 substantially but not entirely filled with a plastic material which may be positioned therein in any of the well-known manners known in the art. Preferably the base portion is filled with the plastic to a level somewhat above that illustrated in Fig. 2 and then pressure is exerted on the plastic to force it into the base portion and through the perforations 5. During this step of the process if it is a vulcanizable material which is the preferred form, the material may be partially vulcanized, but it is preferable that it not be fully vulcanized so that the plastic of the body will unite therewith in the succeeding steps of the process.

The next step is to position the base portion in a mold herein shown as being composed of two halves, 6 and 7, with suitable steam chambers 8 for the curing medium. The mold herein indicated is merely conventional and anyone skilled in the art will understand how to construct the necessary mold to secure the results set forth herein. Before the mold is closed, a core body 9 which is herein shown as being made of wood is positioned with the base portion thereof within the lip portion 4, thus supporting one end of the core and locating it in proper position in the mold. The other end of the core is provided with an opening to receive the pin 10 which will thus support and locate this end of the core in proper position.

The outer surface of the core is preferably coated with rubber, indicated at 11, before it is inserted in the mold or the rubber may be injected into the mold after the core is inserted in the mold and the mold has been closed. The length of the pin 10 which is arranged to be suitably locked in the mold itself as by welding to one portion thereof is such that the core is held firmly within the lip portion 4 of the base during the molding operation. If found necessary this pin can be so arranged in the mold as to be adjustable lengthwise to force the core into the lip portion.

Figure 1:
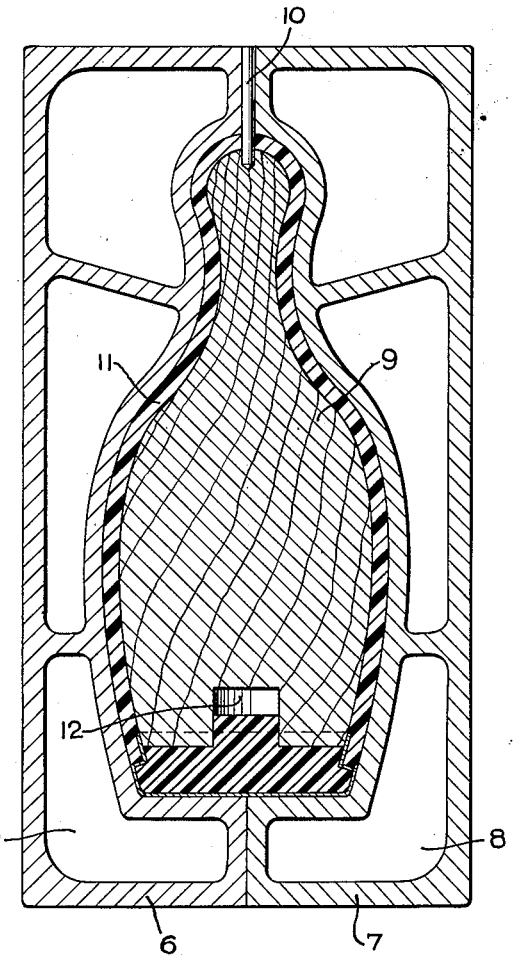
Fig. 1 is a sectional view of a mold with a pin made according to this invention arranged therein.

During the molding operation, the rubber, which has been forced through the perforations 5 in the first step of the process, is united with the sidewall portions and forms an integral portion thereof so that the eventual construction of the pin is as illustrated in Fig. 1, namely an outer plastic wall with a metal exposed base portion extending across the entire width of the base and upwardly along the side edges thereof for a short distance. This prevents damage to the outer peripheral edges of the bottom of the pin, thus increasing the useful life of the pin and keeping the bottoms flat for a longer period of time. If the metal becomes damaged it is possible to reprocess these pins by replacing the metal portion by one that is in good condition.

While I have described my invention as employing a metal base portion I do not wish to be limited to metal but preferably the material from which the base portion is formed should be a relatively hard substance which will stand a considerable amount of abuse.

It will be noticed also that part of the plastic material extends upwardly into the opening 12 in the core 9, thus forming a further interlock with the core and also providing means whereby excess plastic material can flow from within the base portion. It is also understood that the surface of the core can be roughened or provided with perforations to more firmly unite the plastic with the core.

Having thus fully described my invention what I claim and desire to secure by Letters Patent of the United States is:

1. A bowling pin comprising a body, a base portion of cup shape having a flat bottom and an upstanding annular wall arranged about the base of said body, an inwardly extending perforated flange at the upper edge of the wall terminating at its inner edge in an offset portion engaging the body and shaped substantially the same as the adjacent portion of the body to position the body with respect to the base portion and to hold said body spaced from said wall and bottom of said base portion, a plastic covering the upper part of the body and filling the space between the base portion and body and united integrally therewith through said perforations.

2. A bowling pin comprising a pin body, plastic material covering substantially the entire body, a metal cup shape base for the pin and means on said base projecting through said plastic covering material and engaging said pin body to maintain said base in spaced predetermined relation to the pin body, the plastic filling the space between the base and the pin body and being bonded to the pin body and interlocking with said spacing means.

3. A bowling pin comprising a pin body, a metal base portion having a bottom wall and a contiguous upstanding wall receiving the lower end of the pin body and being provided with integral spacing means projecting inwardly toward the pin body into engagement therewith to hold the walls of said base portion substantially spaced from said pin body, and a plastic material bonded at least to said body and filling the space between said body and base portion, said plastic mechanically interlocking with said spacing means to hold said base portion in juxtaposition with respect to said body, and said spacing means comprising an integral inwardly turned lip, at the upper edge of said wall, engaging said body and having perforations therethrough, and in which the upper part of said body is covered with plastic integrally united with the plastic between said pin body and base portion through the said perforations.

References Cited in the file of this patent

UNITED STATES PATENTS

| | | |
|---|---|---|
| 514,323 | Krumbeck | Feb. 6, 1894 |
| 1,308,527 | Wilson | July 1, 1919 |
| 1,422,232 | Stanley | July 11, 1922 |
| 1,702,226 | Bruninghans | Feb. 12, 1929 |
| 2,166,950 | German et al. | July 25, 1939 |
| 2,289,872 | Brinkmann | July 14, 1942 |
| 2,446,213 | Clark et al. | Aug. 3, 1948 |
| 2,517,116 | Klinger | Aug. 1, 1950 |
| 2,551,272 | Leonard | May 1, 1951 |